Nov. 30, 1965  A. P. BIRD  3,220,768
COVER FOR UPHOLSTERED SEATS
Filed Oct. 2, 1963  2 Sheets-Sheet 1

Arthur P. Bird
INVENTOR.

Nov. 30, 1965   A. P. BIRD   3,220,768
COVER FOR UPHOLSTERED SEATS
Filed Oct. 2, 1963   2 Sheets-Sheet 2

Arthur P. Bird
INVENTOR.

BY *Clarence A. O'Brien
and Harvey B. Jacobson*
Attorneys 3,220,768
COVER FOR UPHOLSTERED SEATS
Arthur P. Bird, Box 24, Stollings, W. Va.
Filed Oct. 2, 1963, Ser. No. 313,323
1 Claim. (Cl. 297—223)

The present invention relates to furniture covers, generally speaking, but has reference, more particularly, to a readily applicable and removable cover which is made of commercially acceptable as well as suitable launderable seat cover material whether used on furniture in one's home or on upholstered seats such as are used in automobiles and the like.

As the preceding general statement of the invention implies, the present inventive concept has to do with the idea of minimizing soilage and consequently affording protection for one's wearing apparel while seated at home or while seated and riding in an automobile. To the ends desired the means is such as construction that it is adapted to spread neatly and tautly over the normally usable seating surfaces of cushioned upholstered furniture, a chair, couch, automobile seat for example, and which means more particularly pertains to a readily applicable and removable cover. As suggested, the cover is made of washable seat cover material and each cover is of an area to properly span and spread over the usable surfaces, not only of the seat but backrest, too. In carrying out the preferred embodiment the seat and backrest cover is equipped with self-contained means which is preferably marginally located so that once the cover is in its intended performing position it is then snug fitting but is nevertheless easily attachable and detachable.

It is believed that it will simplify the presentation of the instant invention to regard it as expressly, but not necessarily, designed and adapted for protective use in association with normally usable surfaces of the upholstery-covered seats in an automobile. With this in mind the invention pertains to cover means of a versatile nature which is such in construction and adaptability that it permits the user to enjoy use of the car's original upholstery and greatly minimizes the likelihood of soiling the same too soon, as it were, and causing it to wear out or be otherwise undesirably impaired with the result that its "new look" is extended and preserved over a greatly prolonged period of time.

Briefly summarized the invention comprises a seat and backrest cover for automobile seat constructions wherein the same is provided around its margin or border with a hem, said hem being provided with an elastic or an equivalent drawing cord (equivalent to and functioning as a drawstring), whereby the user can quickly and easily apply and remove the cover.

Another improvement resides in providing the gatherable hem with cutouts or notches. These notches are arranged at spaced-apart points and are such that they open through the outer perimeter edges of the hems and consequently serve to expose limited portions of the elastic cord or equivalent element whereby to permit hook-equipped and equivalent fasteners and clips to be detachably connected with the exposed portion and hook means at an opposite end thereof to be detachably anchored on the seat frame or equivalent mechanical readily accesible holddown means.

A further improvement resides in the adoption and use of a length of elastic which for sake of distinction will be referred to as a cover spanning and tie-down element, the latter extending across the median portion of the cover to thus transform the cover into a seat portion and a backrest portion with the line of demarcation in line with the junctional association between the lower part of the backrest and rear marginal edge portion of the seat. The ends of this tie-down element are provided with attaching hooks and portions of the elements adjacent to the hooks are laced or threaded through holddown clips which are provided for that purpose on intended members of the base part of the seat's frame.

The cover as herein comprehended introduces a "flip side" feature and is therefore of a multipurpose character in that it accommodates, to better advantage, the needs of those who ride in automobiles and dislike greatly the idea of inadvertently or otherwise soiling wearing apparel as a result of having to occupy a soiled or dirty seating surface. As will be later clarified the seat covering component of the overall cover is such that in its normal position it spreads over and covers the original upholstery on the automobile seat. However and in a second position it can be swung up and then flipped back, as it were, so that the previously existing underneath side thereof now becomes a cover surface for the portion of the cover which spans or extends over the usable surface of the backrest.

Also and as will be hereinafter more fully appreciated the invention pertains to an automobile seat cover which is unique in that it is of a multipurpose type designed for both the automobile upholstery, home furniture and the like; a cover that is easily installed and removed for laundering and which involves a minimum amount of time and labor in taking care of the attaching and detaching steps. Another aspect pertains to protective covering for an automobile seat that does not require the use of the second cover to protect it and consequently eliminates the problem of one cover to protect another cover, and so on.

Novelty is also predicated on a protective automobile seat cover which is such in construction that it functions for practical use for both two door and four door style automobiles and includes special hooking and stretching components to permit the flexing and folding of the same when used for instance in connection with seats in two door cars.

The invention also takes into account simple, practical and feasible seat cover means which is such in construction that it requires no tying, clamping or pinning to keep it in place.

Novelty in addition is predicated on the idea of a protective cover that is of a reversible nature and design that can be utilized either by persons traveling to and from or at work or under any conditions where a protective cover is needed for the automobile. Then, when a clean and different condition is desired the user simply reverses or "flips" the cover over while it remains on the seat and backrest. This operation can be repeated as many times and as often as desired.

Further, the concept pertains to a protective cover designed not only to protect against soiling of the automobile upholstery but one which also protects the clothing or apparel of the user by reason of the fact that the half-portion of the seat cover which lies against the top surface of the seat cushion is capable of being detached at its forward or lower edge and then folded upwardly into overlying relation to the portion of the seat cover which engages the front surface of the backrest.

Other objects, features and advantages of the invention will become more readily apparent from the following description and the accompanying illustrative drawings.

In the drawings, wherein like numerals are employed to designate like parts throughout the views:

FIGURE 1 is a view in perspective showing the seat and backrest components of an automobile seat construction and which illustrates, more particularly, the multipurpose readily applicable and removable protective cover;

FIGURE 2 is a view in perspective similar to FIG. 1 and which illustrates the horizontal half-portion of the cover detached and then flipped or swung upwardly and folded against the front surface of that portion of the cover which is still in position on the backrest to thus present a clean surface of the cover to the back of the person using the seat and also presenting the clean original upholstery surface;

Figure 5:
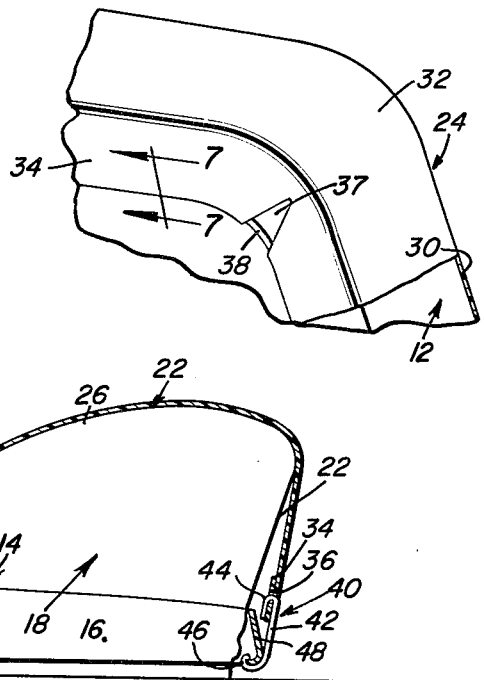
FIGURE 5 is a fragmentary perspective view with portions broken away and appearing in section and which serves to illustrate the gathering hem carried by the marginal portion of the upper half-portion of the attachable and detachable protective cover.
Figure 6:
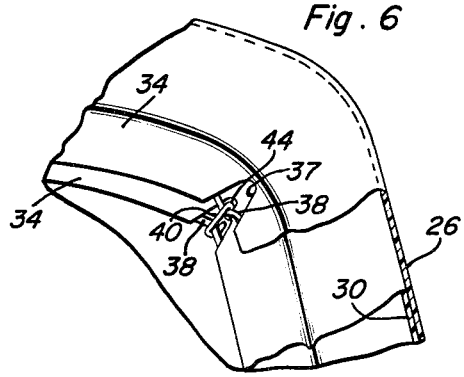
Figure 7:
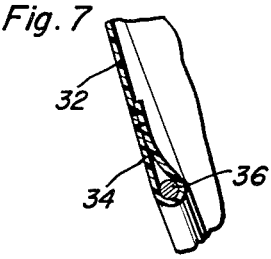

FIGURE 6 is a view also fragmentary and in perspective and section and elevation similar to FIGURE 5 but which shows the manner in which the foldable lower seat covering half-portion of the protective cover has been swung up to an out-of-the-way or folded position and how it is then clipped in place to guard against accidental displacement; and FIGURE 7 is an enlarged detail section taken on the plane of the section line 7—7 of FIGURE 5.

Figure 2:
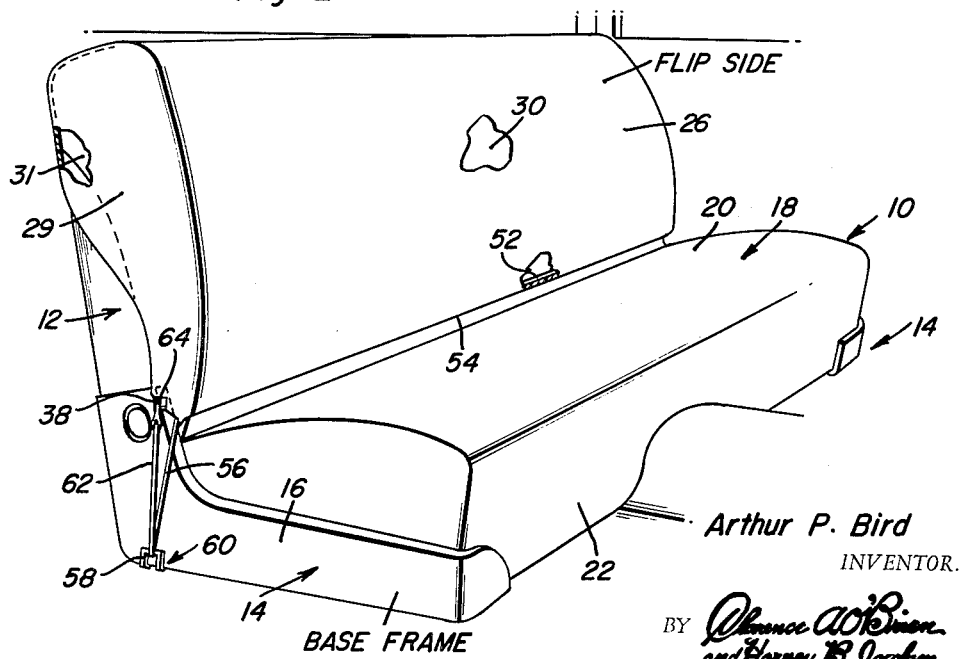
Figure 3:
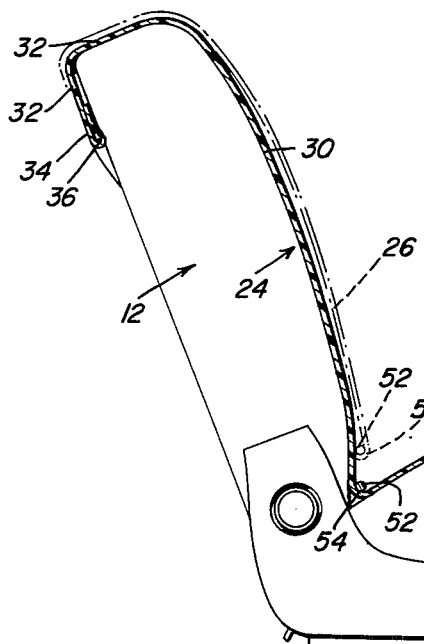
FIGURE 3 is a section taken on the section line 3—3 of FIG. 2.

Referring now to the views of the drawings with greater particularity it will be evident (FIGS. 1, 2 and 3) that the invention is illustrated for use in conjunction with a seat construction such as is presently being installed in automobiles and equivalent motor vehicles. While, as already mentioned, the cover means is susceptible of practical use on upholstered furniture (chairs, couches and the like used in the home, office or elsewhere) it is best suited, it is submitted, for automobile and equivalent use. The expression "seat structure or construction" is to be interpreted accordingly where for instance the seat constitutes the horizontal component depicted, for example, in FIG. 2 and denoted at 10, the companion backrest being denoted at 12. The base or frame structure of the overall seat construction is denoted generally at 14, the end frame members being denoted at 16. The upholstered cushion 18 has a seating surface 20 and a depending forward surface 22 which surfaces are subject to wear, tear and soilage. The cushioned backrest is also subject to damage from wear and tear and soilage which accounts for the widespread and acceptable use of seat covers. It follows that the present invention, as already suggested, has to do with an innovation which will be repeatedly referred to in the instant disclosure as a "flip" cover. In fact, the cover is versatile in nature in that it is possessed of features not found in commonly used seat covers. As is evident from the views of the drawing, the seat cover will be made of appropriate washable or launderable seat cover material, the construction and arrangement being such that the user can enjoy the repeated use of the original upholstery without fear of soiling it and with the idea of maintaining the desired "new look" thereof for an indefinite period of time. The seat cover is denoted in its normal usable position in FIG. 1 wherein it will be noted that the part thereof denoted at 22 constitutes the lower half-portion while the upper half-portion is denoted at 24. The area 26 of the half-portion 22 is spread tautly over and covers the seating surface 20 of the original upholstered seat 10. The forward and end apron portions are denoted at 28 and 29, respectively. That part of the upper half-portion 24 which is spread over the forward or front surface of the backrest cushion is denoted at 30 and the transverse end portions at 31. It should be noted that the upper marginal portion 32 (FIG. 5) is drawn over the coacting marginal edge portions of the backrest structure and that the marginal edge portion is fashioned into an appropriate hem 34 which is provided therein with an elastic so-called gathering cord or elastic member 36 (see FIG. 7). This hem extends around the entire marginal edge portion of the overall cover and cutout or notches are provided as at 37 to expose and render accessible limited portions 38 of the elastic element or cord.

By exposing limited portions 38 of the elastic element it will be evident that the depending apron portions 28 and 29 of the section 22 can be held down and thus maintained in usable position. This can be accomplished by employing simple hook-shaped clips 40 (see FIG. 3) wherein the clip 42 has a hook 44 engaging the elastic element and a hook 46 at the bottom which is engaged releasably over the frame member 48. Thus there are no permanent fastenings here such as are commonly required on automobile seat covers. Also when it is desired to detach the part or portion 22 all that is necessary is to release the hooks or clips 40. With reference now to FIG. 6 it will be seen that the same hook clips 40 can be used for fastening the half-portions 22 and 24 together in overlapping relationship, this being the "flip" feature of the cover. In respect to the half-portion 24 it is to be assumed that this is to remain in place primarily by way of the aforementioned retaining hem 34.

Figure 4:
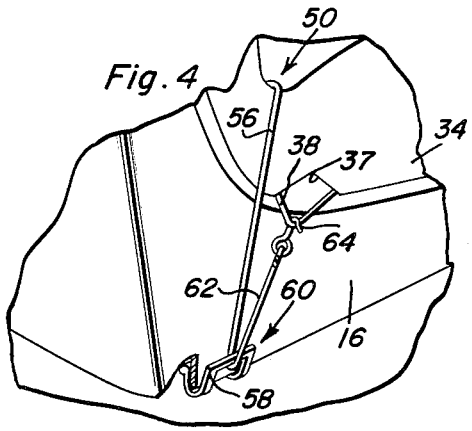
FIGURE 4 is a fragmentary view which serves to illustrate the manner in which holddown clips are provided for retention of the hook-equipped end portions of the tie-down or cover retaining element.

Reference will now be made to the tie-down element 50 which is to be used as a divider between the half-portions 22 and 24. In fact the main portion 52 thereof is stretched tautly across the junctional portion denoted at 54, that is the junctional part between the two portions 22 and 24. The respective free end portions 56 of the tie-down cord or element are drawn down and laced or threaded through the U-shaped portion 58 of the holddown cleat 60 (see FIG. 4). On the terminal end portion 62 a readily attachable and detachable hook or equivalent fastener 64 provides a satisfactory connection with the cooperable portion 38 of the aforementioned hem gathering cord 36.

Figure 1:
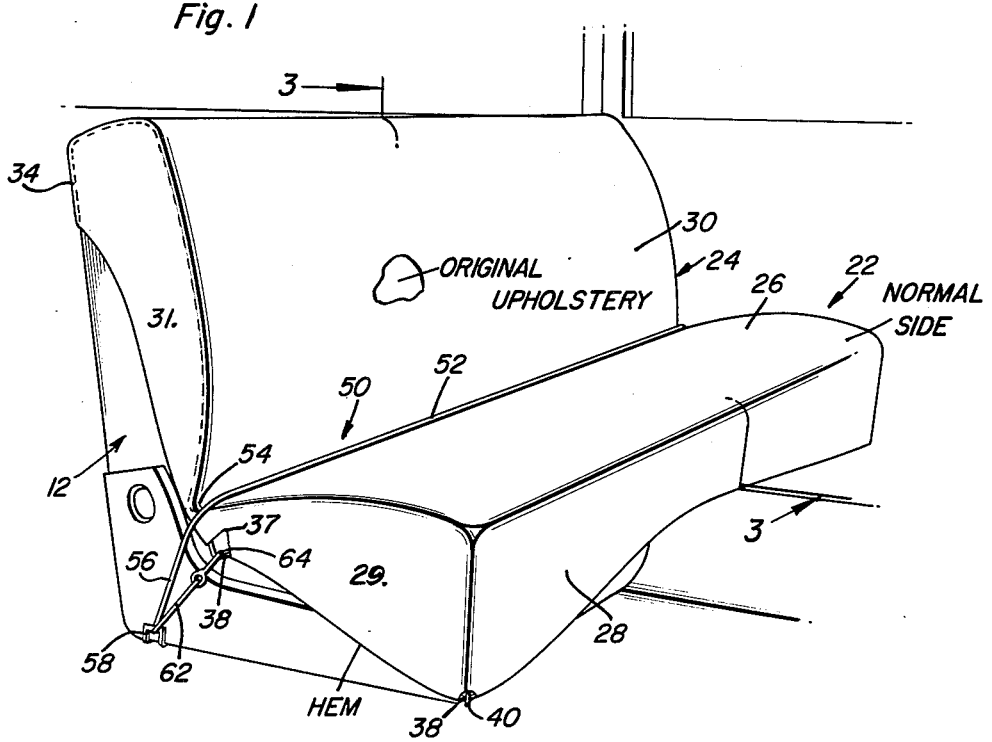

FIG. 1 shows how the component portions 22 and 24 fittingly cover the coacting surfaces of the upholstered backrest and seat respectively. As pointed out the marginal hem and gathering cord constitutes the principal attaching and retaining means. In addition the hooks or clips 40 at the respective left and right corner portions of the base assist in detachably anchoring the apron portions 28 and 29. The tie-down element or cord 50 provides the additionally needed hold-down means. This means 50 also permits the half-portion 22 to be detached, that is the fasteners 40 released after which this portion can then be flipped or folded up so that its hem portion overlaps the hem portion at the top of the backrest as brought out in FIG. 6 whereupon the applied clips 40 aid in keeping the two half-portions of the cover in overlapping or superimposed relationship.

The "flip side" is put into use by simply taking the bottom half of the cover and flipping or folding it back over the backrest. In doing this there is a clean and desirable side of the cover exposed, so just by flipping the cover back one has an acceptable condition for his wife or anyone who would like to avoid a dirty automobile. Dry cleaning alone is of course a factor here, also, the personal pride of ownership, trade-in value, etc. This operation can be repeated as many times as desired then when deemed necesary the cover can be easily removed for laundering and replaced in a minute or so. It has also been conceived a cover that would simply hinge at the meeting place of the backrest and the seat cushion.

In the down position it can be used to protect the original seat material or expensive and permanently attached covers so in this position the automobile would be ready for any type of working person or persons or in any form of recreation, to list a few, mechanics, steel workers, railroad workers, coal miners, miners of all types, service station men, petroleum workers, dock workers, ranchers, farmers, hunters, fishermen, picnic, swimming or sports of any type. Then there are police cars, car rental service, taxis, buses, etc. Any soiling effect which is carried to the seat would be caught on this cover and remain there. This side could be called the top side or down position of the cover.

Seats that have previously been soiled and are in an undesirable condition can be covered using this same cover in a reverse manner; that is to say, just install the cover with the opposite side down covering the entire seat. This feature would be attractive to used car owners.

Cover can be taken off on occasions such as formal dances and etc. where the owner has a new car and prefers to "show off" the original upholstered seats. Also by keeping the cover in the car on such occasions will protect him from an emergency should the cover be needed, since it can quickly be installed at any time on a moment's notice.

The term "drawstring" comprehends and is equivalent to elastic cord, elastic element and vice versa.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

A protector for a vehicular seat assembly embodying a frame, a seat and a complemental backrest having upholstered surfaces, means adapted to be spread over and completely cover the normally usable vulnerable surfaces of said seat and backrest, said means comprising a readily attachable and detachable cover made of launderable material, said cover being provided around its marginal edge with an attached elastic gathering cord which is adapted to fit conformingly around portions of the seat and backrest and thus serve to spread the cover and at the same time hold it in its tautly applied usable position, a tie-down element having fastening means at its ends for attachment to said cord, anchoring cleats adapted to engage the frame of the seat assembly and receiving a portion of the tie-down element therethrough, the major portion of said element extending lengthwise across the median portion of said cover and transforming it in a manner wherein one half-portion is adapted to become the shielding and soil-resisting cover for the seat surface proper, and the other half-portion is adapted to constitute the protecting and soil-resisting cover for the front side of the permanent cover material on the backrest, the marginal edge portions of said one half-portion adapted to encompass the depending front and end portions of the over-all seat constituting skirt portions, the hem thereon and elastic element therein functioning in part, to hold said half-portion in its usable state, and readily attachable and detachable clip means carried by the elastic element and adapted to be connected with stationary components of the frame in a manner which allows the entire half-portion to be freed and then swung, "flipped" upwardly and rearwardly toward the exposed front side of the second named half-portion with said clip means fastening the half-portion in that position, whereby to temporarily cover and shield the otherwise exposed side of the cover and to then expose the clean underneath "flip" side for use and to also uncover the upholstery atop the aforementioned seat.

References Cited by the Examiner

UNITED STATES PATENTS

| Re. 24,805 | 3/1960 | Morrill | 297—229 |
| 1,853,579 | 4/1932 | Sallop | 297—223 |
| 1,917,904 | 7/1933 | Sallop | 297—223 |
| 1,985,222 | 12/1934 | Menhall | 297—223 |
| 2,202,065 | 5/1940 | Peebles | 297—229 |
| 2,652,886 | 9/1953 | Richards | 297—226 |
| 2,789,630 | 4/1957 | Lyle et al. | 297—229 |
| 2,807,314 | 9/1957 | Larkin | 297—229 |
| 2,822,862 | 2/1958 | Zacks | 297—229 |
| 2,904,103 | 9/1959 | Nail | 297—229 |
| 3,008,154 | 11/1961 | Honeyman | 5—354 |

FOREIGN PATENTS

| 542,349 | 11/1955 | Belgium. |
| 1,111,821 | 11/1955 | France. |

FRANK B. SHERRY, *Primary Examiner.*